United States Patent
Strub et al.

(10) Patent No.: US 8,346,265 B2
(45) Date of Patent: Jan. 1, 2013

(54) SECURE COMMUNICATION NETWORK USER MOBILITY APPARATUS AND METHODS

(75) Inventors: Lyle Strub, Ottawa (CA); Clifford Grossner, Ottawa (CA); Laura Mihaela Serghi, Ottawa (CA)

(73) Assignee: Alcatel Lucent, Paris (FR)

( * ) Notice: Subject to any disclaimer, the term of this patent is extended or adjusted under 35 U.S.C. 154(b) by 1266 days.

(21) Appl. No.: 11/465,172

(22) Filed: Aug. 17, 2006

(65) Prior Publication Data

US 2007/0293210 A1 Dec. 20, 2007

Related U.S. Application Data

(60) Provisional application No. 60/814,963, filed on Jun. 20, 2006, provisional application No. 60/814,983, filed on Jun. 20, 2006, provisional application No. 60/815,134, filed on Jun. 20, 2006, provisional application No. 60/815,099, filed on Jun. 20, 2006.

(51) Int. Cl.
*H04M 1/66* (2006.01)

(52) U.S. Cl. ............... 455/441; 455/411; 455/414.1; 455/558; 455/432.3; 455/457; 455/420; 455/436; 455/450; 455/522; 370/331; 370/312; 370/335; 370/338; 370/401; 370/259; 370/389

(58) Field of Classification Search ............ 370/395.53, 370/282, 546, 276, 332, 311, 441, 320, 342, 370/130, 328, 338, 390, 331, 312, 335, 401, 370/259, 389; 379/306, 334; 455/420, 411, 455/41.2, 552.1, 445, 433, 466, 428, 550.1, 455/435.1, 456.1, 414.1; 705/64, 50, 7, 9; 73/304 C
See application file for complete search history.

(56) References Cited

U.S. PATENT DOCUMENTS

| | | | |
|---|---|---|---|
| 6,092,201 A * | 7/2000 | Turnbull et al. | 726/4 |
| 6,839,708 B1 * | 1/2005 | Boydstun et al. | 1/1 |
| 7,065,340 B1 * | 6/2006 | Einola et al. | 455/410 |
| 7,193,985 B1 * | 3/2007 | Lewis et al. | 370/338 |
| 7,204,746 B2 * | 4/2007 | Purkayastha et al. | 455/552.1 |
| 7,437,732 B1 * | 10/2008 | Boydstun et al. | 719/313 |
| 7,457,782 B2 * | 11/2008 | Nakajima | 705/75 |
| 7,539,490 B2 * | 5/2009 | Dickinson | 455/432.1 |
| 2002/0087479 A1 * | 7/2002 | Malcolm | 705/64 |
| 2002/0198748 A1 * | 12/2002 | Eden et al. | 705/7 |
| 2003/0163733 A1 | 8/2003 | Barriga-Caceres et al. | |
| 2004/0078334 A1 * | 4/2004 | Malcolm et al. | 705/50 |
| 2005/0013264 A1 * | 1/2005 | Sundberg | 370/328 |
| 2005/0203855 A1 * | 9/2005 | Malcolm | 705/64 |
| 2005/0272465 A1 * | 12/2005 | Ahmavaara et al. | 455/552.1 |
| 2006/0046714 A1 * | 3/2006 | Kalavade | 455/428 |

(Continued)

FOREIGN PATENT DOCUMENTS

WO WO 2006/045402 A1 5/2006

*Primary Examiner* — Joseph Arevalo (74) *Attorney, Agent, or Firm* — Eckert Seamans Cherin & Mellot, LLC (57) ABSTRACT

Secure communication network user mobility apparatus and methods are disclosed. A mobile user that is locally connected to a first communication network in which a service is provided, but is associated with an independently controlled second secure communication network, may be authenticated for access to the service by the second communication network. This allows seamless user mobility between networks in a partner extranet or other collection of trusted networks based on existing inter-network user mobility relationships. Access control, monitoring, and reporting, for example, and possibly other functions, may also be provided.

21 Claims, 3 Drawing Sheets

U.S. PATENT DOCUMENTS

2006/0234678 A1* 10/2006 Juitt et al. .................... 455/411
2007/0083915 A1* 4/2007 Janakiraman et al. ............ 726/4
2007/0149211 A1* 6/2007 Dunn et al. ................ 455/456.1
2007/0287455 A1* 12/2007 Hsu et al. .................. 455/435.1

* cited by examiner

SECURE COMMUNICATION NETWORK USER MOBILITY APPARATUS AND METHODS

CROSS-REFERENCE TO RELATED APPLICATIONS

The present patent application claims the benefit of U.S. Provisional Patent Application Ser. No. 60/814,963, entitled "SECURE COMMUNICATION NETWORK USER MOBILITY APPARATUS AND METHODS", and filed on Jun. 20, 2006, the entire contents of which are incorporated herein by reference.

The present patent application is related to each of the following provisional patent applications, which were filed on Jun. 20, 2006 and are entirely incorporated herein by reference:

U.S. Provisional Patent Application Ser. No. 60/814,983, entitled "NETWORK SERVICE PERFORMANCE MONITORING APPARATUS AND METHODS";

U.S. Provisional Patent Application Ser. No. 60/815,134, entitled "SECURE DOMAIN INFORMATION PROTECTION APPARATUS AND METHODS";

U.S. Provisional Patent Application Ser. No. 60/815,099, entitled "COMMUNICATION NETWORK APPLICATION ACTIVITY MONITORING AND CONTROL".

The present patent application is also related to U.S. patent application Ser. No. 11/557,287 which was filed on Nov. 7, 2006 claiming the benefit of U.S. Provisional Patent Application Ser. No. 60/814,983, U.S. patent application Ser. No. 11/467,387 which was filed on Aug. 25, 2006 claiming the benefit of U.S. Provisional Patent Application Ser. No. 60/815,134, and U.S. patent application Ser. No. 11/460,789, filed on Jul. 28, 2006 claiming the benefit of U.S. Provisional Patent Application Ser. No. 60/815,099.

FIELD OF THE INVENTION

This invention relates generally to communications and, in particular, to providing for mobility of users between secure communication networks.

BACKGROUND

Administrators of private communication networks such as corporate enterprise networks do not currently have convenient options for providing temporary network access for "mobile" external users, such as contractors or employees of partner enterprises, that may at times locally connect to their networks. Network access for such mobile users normally requires manually creating local user identities in a Lightweight Directory Access Protocol (LDAP) directory or analogous user database, for example, and manually granting access to services. Service access may be granted at a policy server or directly at individual application servers.

When a mobile user is no longer on-site, the corresponding local user identity must be deactivated and service access for this identity must be closed. The entire life cycle, from creation to deactivation, for temporary identities is often restricted to be no more than one day.

The manual creation and maintenance of temporary digital identities, as well as the associated service access activation and deactivation, for mobile users of partner corporations tends to be a very inefficient and costly process. It also can open significant security holes in a corporate network if temporary identities are not deactivated and/or service access rights are not removed when a mobile user is no longer on-site.

User mobility might be particularly important to enable the use of services for which information is distributed through a communication network, generally referred to as network services. "Web services" are an example of network services, and represent the next generation of technology being used for automatically exchanging information between different applications over the public Internet and many private networks. Web services provide a framework for building web-based distributed applications, and can provide efficient and effective automated machine-to-machine communications.

From a technology point of view, web services are network accessible functions that can be accessed using standard Internet protocols such as HyperText Transfer Protocol (HTTP), extensible Markup Language (XML), Simple Object Access Protocol (SOAP), etc., over standard interfaces.

The real power of web services technology is in its simplicity. The core technology only addresses the common language and communication issues and does not directly address the onerous task of application integration. Web services can be viewed as a sophisticated machine-to-machine Remote Procedure Call (RPC) technology for interconnecting multiple heterogeneous untrusted systems. Web services take the best of many new technologies by utilizing XML technology for data conversion/transparency and Internet standards such as HTTP and Simple Mail Transfer Protocol (SMTP) for message transport.

One of the primary drivers behind the development and standardization of web services is the ability to facilitate seamless machine-to-machine application-level communications by providing a loose coupling between disparate applications. Such a loose coupling of applications allows applications on different servers to interoperate without requiring a static, inflexible interface between them. Applications using very different technologies can interoperate using standard web services protocols.

There are currently no available products that allow user mobility amongst the sites of a partner extranet or other collection of communication networks, as noted above. Thus, there remains a need for improved user mobility techniques.

SUMMARY OF THE INVENTION

According to an embodiment of the invention, automatic authentication of on-site employees of partner corporations without any manual provisioning of temporary identities is provided.

A method is provided in accordance with an aspect of the invention, and includes receiving, at a first secure communication network in which a network service is provided, service access information associated with local access to the service by a mobile user, the mobile user being associated with an independently controlled second secure communication network but locally accessing the service from within the first communication network, and requesting the second communication network to authenticate the mobile user.

The may also include controlling access to the service by the mobile user based on a result of the authentication by the second communication network.

In some embodiments, the method includes receiving from the second communication network an automatically generated digital identity to be used by the mobile user in the first communication network, in which case further operations of storing the identity in a mobile user database at the first communication network and forwarding the identity to the mobile user may be performed.

The service access information may include a user authentication request.

A service access request may be included in the service access information. The method may then include determining whether the mobile user has been previously authenticated by the second communication network, and requesting the second communication network to authenticate the mobile user where the mobile user has not been previously authenticated by the second communication network.

The operation of controlling access may involve granting access to the service in accordance with an access policy.

Receiving may involve receiving the service access information at a web services node of the first communication network.

Where a transformation is applied to service access information, associated with external access to the service by the mobile user from the second communication network, for transfer between the mobile user and an application server by which the service is provided, the method may also include applying the transformation to the received service access information.

In some embodiments, the method includes tracking activity of the mobile user in the first communication network, and reporting the tracked activity to the second communication network.

Such a method may be embodied, for example, in instructions stored on a machine-readable medium.

Another aspect of the invention provides an apparatus that includes an interface operable to receive service access information associated with local access by a mobile user to a network service that is provided in a first secure communication network, the mobile user being associated with an independently controlled second secure communication network but locally accessing the service from within the first communication network, and an authentication module operatively coupled to the interface and operable to request the second communication network to authenticate the mobile user.

The apparatus may also include an access module operatively coupled to the authentication module and operable to control access to the service by the mobile user based on a result of the authentication by the second communication network.

Where the access module is further operable to track activity of the mobile user in the first communication network, the apparatus may also include an interface operatively coupled to the access module for enabling the tracked activity to be reported to the second communication network.

In some embodiments, the apparatus includes a memory operatively coupled to the access module for storing service access policies, in which case the access module may be further operable to determine whether the memory stores a policy in accordance with which access to the service by the mobile user is to be controlled, and, where the memory stores a policy in accordance with which access to the service by the mobile user is to be controlled, to control access to the service by the mobile user by granting or denying access to the service based on the policy stored in the memory.

The authentication module may be further operable to receive from the second communication network an automatically generated digital identity to be used by the mobile user in the first communication network.

The apparatus may also include a memory for storing the identity in a mobile user database, and an interface enabling the identity to be forwarded to the mobile user.

Where the service access information includes a service access request, the authentication module may be further operable to determine whether the mobile user has been previously authenticated by the second communication network, and to request the second communication network to authenticate the mobile user where the mobile user has not been previously authenticated by the second communication network.

A web services node for managing web service application usage may include such an apparatus. The web services node may include a gateway that enables remote usage of the service from the second communication network and is configured to perform a transformation of information relating to remote usage of the service from the second communication network, and to perform the transformation for information relating to local access to the service by the mobile user.

According to another aspect of the invention, there is provided a method that includes receiving, from a first secure communication network in which a network service is provided, a request for an independently controlled second secure communication network, with which a mobile user is associated, to authenticate the mobile user for local access to the service from within the first communication network, authenticating the mobile user according to user identity records at the second communication network, and providing to the first communication network an indication of a result of the authentication.

The method may also include creating at the second communication network a digital user identity to be used by the mobile user in the first communication network, where the mobile user is successfully authenticated. In this case, providing may involve providing the user identity to the first communication network.

A machine-readable medium may store instructions which when executed perform the method.

An apparatus according to another aspect of the invention includes an interface for exchanging information between a first secure communication network and an independently controlled second secure communication network, and an authentication module operatively coupled to the interface and operable to receive through the interface a request from the first communication network to authenticate a mobile user associated with the second communication network for local access from within the first communication network to a service provided in the first communication network, to authenticate the mobile user according to user identity records at the second communication network, and to provide an indication of a result of the authentication to the first communication network through the interface.

The authentication module may be further configured to create a digital user identity to be used by the mobile user in the first communication network, where the mobile user is successfully authenticated, and to provide an indication of a result of the authentication by providing the user identity to the first communication network.

According to yet another aspect of the invention, a data structure stored on a machine-readable medium includes an identifier of a mobile user by whom a service provided in a first secure communication network may be locally accessed from within the first communication network, and an identifier of an independently controlled second secure communication network with which the mobile user is associated and by which the mobile user is to be authenticated for local access to the service.

The data structure may also include an access record providing an indication of local access to the service by the mobile user after the mobile user is authenticated by the second communication network.

Other aspects and features of embodiments of the present invention will become apparent to those ordinarily skilled in the art upon review of the following description.

BRIEF DESCRIPTION OF THE DRAWINGS

Examples of embodiments of the invention will now be described in greater detail with reference to the accompanying drawings.

DETAILED DESCRIPTION OF PREFERRED EMBODIMENTS

Figure 1:
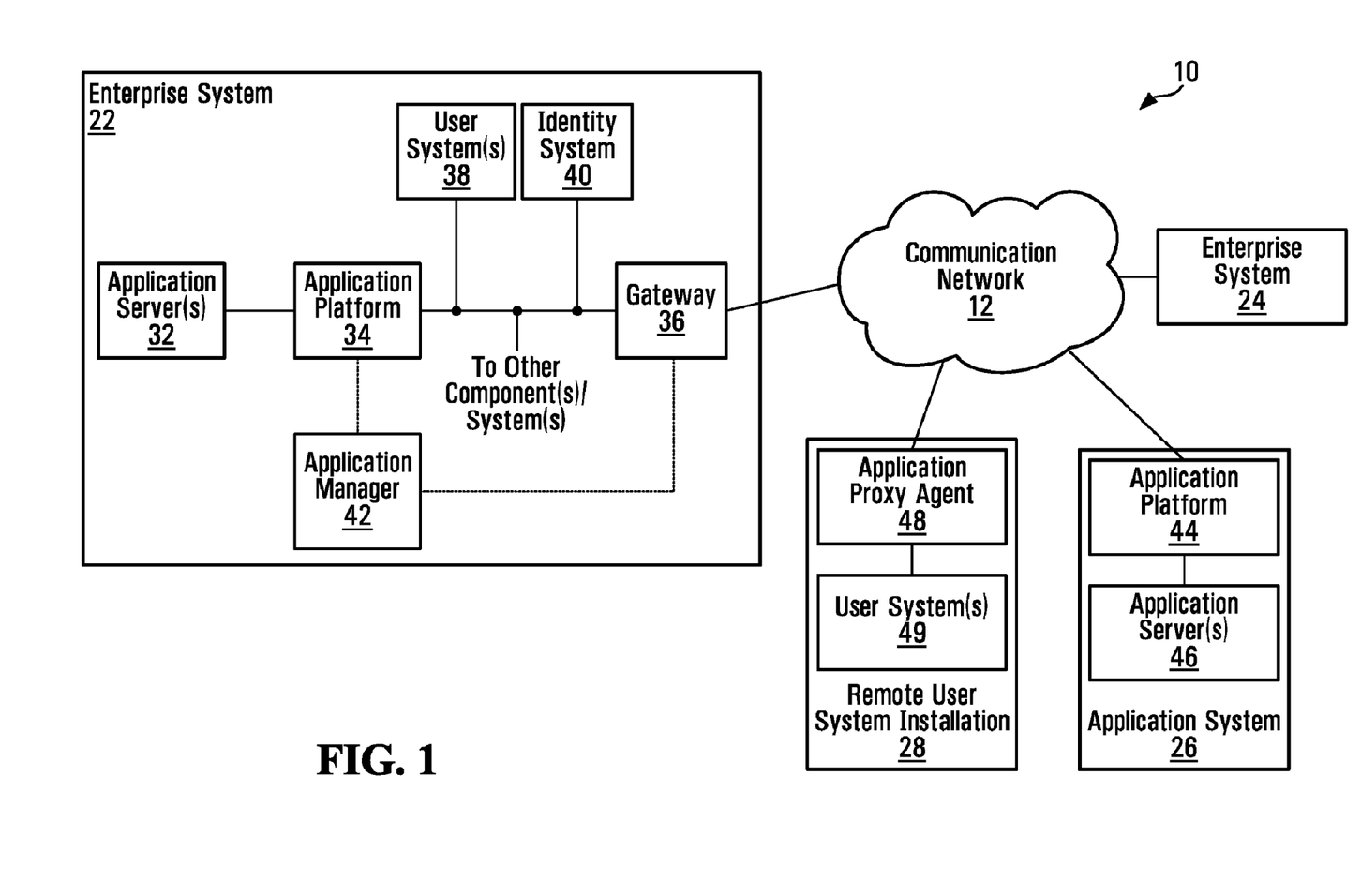
FIG. 1 is a block diagram of a communication system.

FIG. 1 is a block diagram of a communication system in which embodiments of the invention may be implemented. The communication system 10 includes a communication network 12, to which enterprise systems 22, 24, an application system 26, and a remote user system installation 28 are operatively coupled through respective communication links.

The enterprise system 22 includes one or more application servers 32, an application platform 34 operatively coupled to the application server(s), a gateway 36 operatively coupled to the application platform and to the communication network 12, one or more user systems 38 operatively coupled to the application platform and to the gateway, an identity system 40 operatively coupled to the application platform, to the user system(s), and to the gateway, and an application manager 42 operatively coupled to the application platform and to the gateway. Other components or systems, such as firewalls located on either side of the gateway 36 to provide a DeMilitarized Zone (DMZ), may also be deployed. The enterprise system 24 may have a similar structure.

In the application system 26, an application platform 44 is operatively coupled to the communication network 12 and to one or more application servers 46. The remote user system installation 28 includes an application proxy agent 48 operatively coupled to one or more user systems 49.

Although many enterprise systems, application systems, remote user system installations, and possibly other types of systems may be provided in a communication system, only illustrative examples of certain types of systems have been shown in FIG. 1 to avoid overly complicating the drawing. Internal details of the communication network 12, such as border or access equipment and core switching/routing components, and the enterprise system 24 have also been omitted from FIG. 1 for similar reasons. The type, structure, and operation of the communication network 12 may vary between deployments of embodiments of the invention. Other embodiments of the invention may also include enterprise systems, application systems, and/or remote user system installations that include fewer, further, or different components, with similar or different interconnections, than shown.

It should therefore be appreciated that the communication system 10 of FIG. 1, as well as the contents of the other drawings, are intended solely for illustrative purposes, and that the present invention is in no way limited to the particular example embodiments explicitly shown in the drawings and described herein.

Those skilled in the art to which the present invention pertains will be familiar with many different types of communication networks, including overlay networks such as application layer networks and more traditional infrastructures. The present invention is not limited to any particular type of communication network. In one embodiment, the communication network 12 is the Internet or some other public network.

Many examples of access technologies through which the systems 22, 24, 26, 28 access the communication network 12 will also be familiar to those skilled in the art, and accordingly have not been separately shown in FIG. 1.

Considering first the enterprise system 22, an application server 32 supports applications that may provide functions, illustratively services, for use by at least the local user system(s) 38. Where multiple application servers 32 are deployed, each server supports a respective set of functions or services, which may or may not overlap the services supported by other servers.

In some embodiments, these functions are also made available for use by external user systems, such as user systems in the enterprise system 24, where owners or operators of the enterprise systems 22, 24 have an agreement for inter-system access by their users, and/or the user system(s) 49 at the remote user system installation 28.

References herein to use of applications are intended to convey the notion of any such function. Generally, an application server 32 executes a software application to provide these functions. A service, such as a web service, is an example of an application function that is exposed to user systems, in the context of the present disclosure. Any references to applications, functions, and services should be interpreted accordingly.

An application server 32 may include such components as one or more processors, one or more memory devices, and an interface for exchanging application transaction information, such as service request messages and corresponding responses, with user systems. Memory devices in an application server 32 may be used to store operating system software, application software, etc., for use by the application server processor(s). Enterprise systems such as 22 are often implemented as a network, in which case a network interface enables the application server(s) 32 to communicate with the user system(s) 38 and possibly other components of the enterprise system. In another possible implementation, an application server 32 includes separate interfaces for communicating with different enterprise system components.

A user system 38 may similarly include one or more processors, one or more memory devices, and some sort of interface(s) for communicating with the application server(s) 32, and possibly other components of the enterprise system 22. Operating system software, client software for interacting with the application server(s) 32, and/or other types of information may be stored in user system memory devices.

Those skilled in the art will be familiar with many different types of systems that provide and/or use network applications. Embodiments of the present invention relate primarily to monitoring the use of and restricting access to network applications, as opposed to how these applications are actually supported, and accordingly the application server(s) 32, the user system(s) 38, and their operation are described only briefly herein to the extent necessary to illustrate aspects of the invention.

The identity system 40 represents another component that is commonly provided in enterprise systems such as corporate networks and will be familiar to those skilled in the art. Access to services or other functions supported by the application server(s) 32 in many cases must be restricted to a particular set of users. The identity system 40, which may authenticate users and/or user systems through interaction with a Lightweight Directory Access Protocol (LDAP) directory or other type of user database, for example, supplies a digital identity that may be used for authorizing or denying access to network services.

In terms of structure, the application platform 34 includes application server interfaces that are compatible with the user system interfaces, illustratively Application Programming Interfaces (APIs), of the application server(s) 32, one or more interfaces compatible with the application server interface(s) of the user system(s) 38, and components for processing messages or other information received and/or transmitted through these interfaces. As described in further detail below, external user systems may be able to access the application server(s) 32 through the gateway 36, in which case the user system interface(s) of the application platform 34 may also enable the application platform to communicate with the gateway 36. However, in some embodiments, a separate gateway interface may be provided for this purpose.

The gateway 36 would also include one or more internal interfaces compatible with interfaces of other components of the enterprise system 22, one or more external interfaces for enabling communication signals to be transmitted and/or received through the communication network 12, and intermediate components for processing signals received and/or transmitted through the interfaces.

The application manager 42 represents a control or monitoring element that might not itself perform real-time processing of information as it is transferred between the application server(s) 32 and the local user system(s) 38 or external user systems. The application manager 42 may communicate with the application platform 34 and the gateway 36 through compatible interfaces, to perform such functions as configuring the application platform and/or the gateway, illustratively by downloading access policies to the platform and/or the gateway for enforcement, accessing information for tracking use of applications by mobile users, etc.

Figure 2:
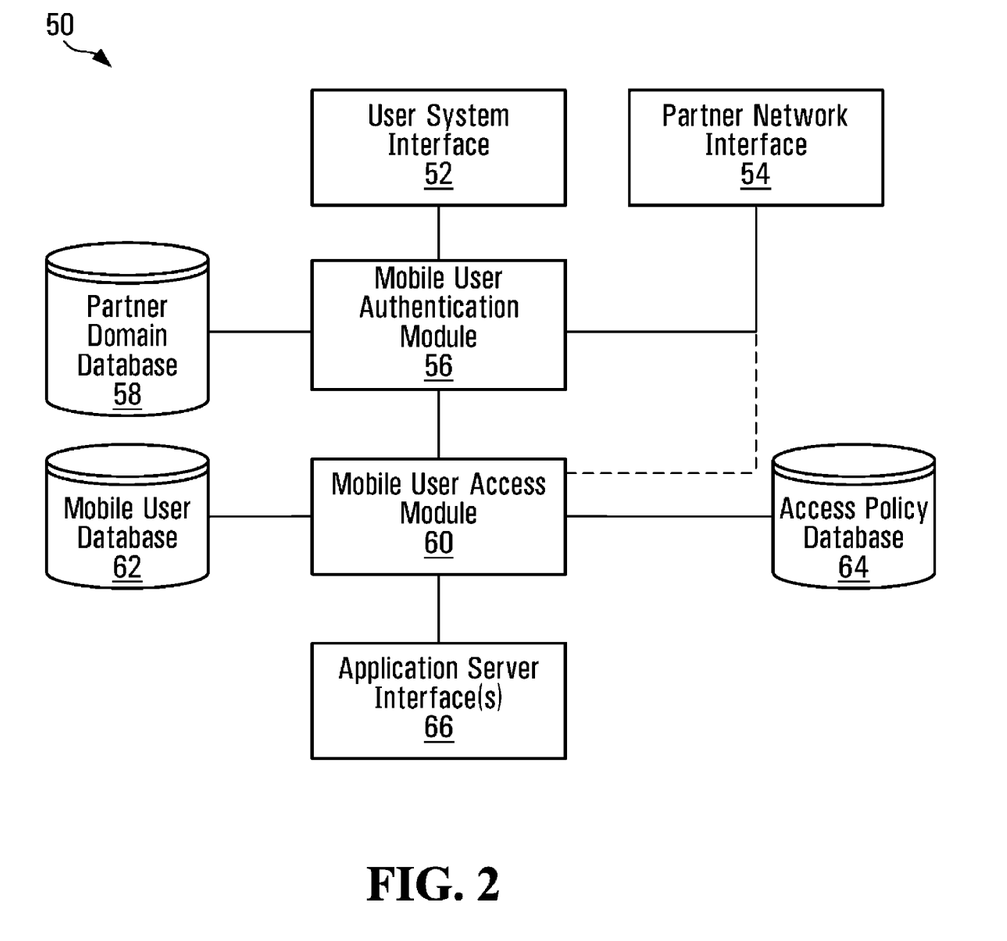
FIG. 2 is a block diagram of an apparatus according to an embodiment of the invention.

The internal components of the application platform 34, the gateway 36, and the application manager 42 may be implemented in hardware, software, firmware, or some combination thereof. An apparatus as described below with reference to FIG. 2 provides an illustrative example of a subsystem that may be provided in the application platform 34 or the gateway 36.

In a traditional deployment of a so-called Service Oriented Architecture (SOA) for an enterprise network, SOA components are individually deployed and integrated on each application server. Publishing a service for use on a network, within the enterprise system 22 for instance, would require a service registry for discovery and management of service offerings. Although web service standards address the need to restrict service access to authorized users, a web services policy server would be needed to store and provide this information. Enforcing these policies can also be a challenge, in that software vendors may require substantial changes to applications and servers in order to adapt to enterprise systems.

All of this can represent a significant project for an enterprise, and may well have a relatively long implementation cycle. In addition, the skill set required to implement such a project is highly specialized, which might make an SOA implementation not economically feasible.

When extending web services or other types of applications to partners, between the enterprise systems 22, 24, for example, even more challenges exist for an SOA infrastructure deployed on application servers. For instance, applications deployed at partner sites might use diverse security mechanisms that cannot share user identity information freely, requiring translation of security tokens for users. Placing the burden of security token translation, or other security functions, on each application server tends to be costly and inefficient.

Data privacy requirements are also very difficult or even impossible to enforce at each application server since application servers themselves might not be aware of whether a user system, or more generally a consumer of its service, is external to its enterprise system.

XML-specific denial of service (XDoS) attacks, and possibly other threats, may be particularly problematic in application server-based SOA implementations. Web services, for example, are open to XDoS attacks, which cannot be effectively dealt with on application servers.

The migration of server-based SOA to a web services model to achieve application interoperability via loosely coupling applications necessitates the need for additional messaging, illustratively in the form of SOAP headers and XML messages, as well as additional processing requirements for managing these messages. This additional overhead consumes network bandwidth and can result in significant new requirements for application server hardware.

An alternate model for deployment of an SOA infrastructure is to integrate the SOA components into enterprise network elements, as shown in FIG. 1. The application platform 34, the gateway 36, and the application manager 42 represent SOA components in the enterprise system 22.

Deploying the SOA infrastructure separately from the application server(s) 32 may provide several benefits: the SOA infrastructure is then application agnostic, applications require minimal modification, the SOA infrastructure is an end-to-end integrated solution, application server processing overhead is minimized, and network bandwidth can be optimized.

With an enterprise system-/network-based SOA deployment, any message translations required for applications to interoperate can be performed according to policies set within the enterprise system, not by the applications themselves. This allows translations to be defined independently of applications, removing the reliance on application vendor implementations.

The business logic required to adapt message format and content is thus provided by the enterprise, not by the application, minimizing application modification. Web services messages, for example, can be adapted within an enterprise network to achieve application interoperability. As new interoperability requirements arise, perhaps due to merger, acquisition, or the need to integrate with a new partner, no application modification is required. New policies for message translation can instead be defined to provide for the new interoperability.

An SOA infrastructure deployed as an integrated enterprise network solution can provide a single monitoring, control, and consolidated reporting point, illustratively the application manager 42. This can be important to enable proper corporate governance, continuous corporate improvement, and the ability to demonstrate compliance with regulations concerning data privacy and network security, for instance.

Application server processing requirements for application interoperability can be significantly reduced for two reasons: application server offload and a reduced number of required translations. Translations can be done once, at the application platform 34, for example, and then forwarded onto multiple destinations rather than each application performing its own translation.

The network bandwidth consumed by additional message traffic can be reduced by routing packets to the application server(s) 32 based upon inspecting the message SOAP headers, XML tags, or other message content. Routing can be sensitive to application contexts rather than based on static IP addresses, for example.

If application server functions are to be extended to partner enterprise systems, an SOA infrastructure deployed as enterprise network infrastructure may provide many further advantages. Translation of security tokens can be done once at the demarcation point between the partners' networks, illustratively at the gateway 36 for external accesses to the application server(s) 32, providing a single enforcement point for security policy. Data privacy can also be enforced at the point where data leaves a security domain, again at the gateway 36, for example. This drives efficiencies and reduces costs. In addition, denial of service attacks targeted at corporate web services can be defended at the gateway 36, the enterprise network edge, which is perhaps the most secure place to deal with this issue.

The application platform 34 provides an SOA infrastructure for integrating applications that traditionally have run as stand-alone applications, and may enable such capabilities as controlling and monitoring all activity initiated by a validated user to thereby allow generation of a consolidated audit trail, translation for message and document formats, managing the life cycle for applications including the staged rollout of web services and rollback to previous versions in the event of unexpected behavior for instance, and monitoring application/service performance to ensure that applications/services meet internal corporate requirements.

This listing of example functions of the application platform 34, like other functional examples noted herein, is by no means restrictive or exhaustive. Many functions may be implemented independently, every embodiment need not necessarily provide all functions, and other functions may also be or become apparent to those skilled in the art.

Benefits of the application platform 34 may include reduced application integration cost through minimum change to existing applications, as noted above, ensuring that access to corporate applications complies with Government regulations, a central monitoring and control point for employee access to web services, and continuous corporate improvement through consolidated reporting.

The gateway 36 effectively extends an intranet SOA provided by the enterprise system 22, through the communication network 12, into an extranet, allowing seamless integration with customers and partners without compromising security or privacy. Functions of the gateway 36 may include, possibly among others, any or all of extending applications to a partner extranet and branch locations, providing seamless mobility for partner access to applications, ensuring partner access to corporate applications complies with Government regulations, and maintaining privacy of corporate identities without compromising traceability.

In providing mobile access to the application server(s) 32 from any partner sites associated with the enterprise system 22, the gateway 36 may allow the secure identification of partner institutions and acceptance of identities between different security domains. Application message and data translations, for user systems associated with external partner sites, may also be provided by the gateway 36, while ensuring that all data remains private as per corporate policy. A consolidated audit trail of all application access may be collected and provided to an external partner enterprise system by the gateway 36, to demonstrate conformance with regulations for instance.

The application manager 42 provides a central point for monitoring and control of the application platform 34, the gateway 36, and any other platforms and gateways (not shown) in the enterprise system 22. Globally consistent policies for all applications, so as to ensure improved corporate governance and/or compliance with Government regulations, can also be established in some embodiments through the application manager 42 and distributed to the application platform 34 and to the gateway 36 for enforcement. The central application manager 42 may also provide for globally consistent application change management.

As noted above, the enterprise system 24 may be substantially similar to the enterprise system 22.

The enterprise system 22 includes both application server(s) 32 that support applications and one or more user system(s) 38 that may use those applications. However, it should be appreciated that application servers and user systems need not necessarily be co-located. The application system 26, for example, includes one or more application servers 46, but no local user systems. Although only an application platform 44 is shown in the application system 26, some implementations of an application system might also include a gateway. Whereas the application system 26 as shown might be suitable, for example, for a remote data center that is associated with a primary data center as the enterprise system 22, a stand-alone or "unaffiliated" application system that hosts applications for use by external user systems might also include a gateway for handling authentication of the external users for instance.

The application platform 44 in the application system 26 may interact with the application manager 42 of the enterprise system 22, or more generally the application manager of its affiliated enterprise system. In the case of a stand-alone application system, a local application manager may be provided. In some implementations, an external services controller interacts with SOA infrastructure components in multiple different domains. For example, an external services controller that is operatively coupled to the communication network 12 might configure the gateway 36 and a gateway in the enterprise system 24 to collect and exchange application performance statistics.

A user-only deployment is shown in FIG. 1 as the remote user system installation 28. The application proxy agent 48 allows the user system(s) 49 at a partner or branch location, for example, to use applications provided by remotely located application servers. In one embodiment, the application proxy agent 48 is a scaled-down version of the gateway 36. The application proxy agent 48, like the gateway 36, might maintain privacy of corporate identities during authentication of the user system(s) 49 with the enterprise system 22 without compromising traceability, and support secure communications through the communication network 12 using tunnelling techniques, for example, but need not necessarily be able to authenticate external users since the remote user system installation 28 does not host applications that could be used by external user systems.

In operation, a user system 38 that wishes to make use of an application provided by an application server 32 is first authenticated by the identity system 40. Those skilled in the art will be familiar with many security schemes that may be used for this purpose, such as username/password authentication. Where remote access to an application server 32 is supported, user authentication may be handled by the gateway 36, possibly through interactions with an external identity system. The gateway 36 may also be involved in authentication when a user system that is associated with a partner enterprise system or site is locally connected to the enterprise system 22 and wishes to access an application server 32.

When a user has been authenticated, messages or other forms of information may be exchanged between a user system and the application server(s) 32. A user may be allowed to access multiple applications after a single successful authentication.

As noted above, the creation and maintenance of temporary user identities for non-employees that work on-site and need to access local services can present a significant challenge for network and application administrators at many corporations. These temporary users are quite often employees of partner corporations, such as contractors, consultants, auditors, etc., and might require access to a restricted set of applications or services only while they are physically on-site. Meeting these requirements is not only a large amount of work for administrators but may also open holes in their security model.

The term "mobile user" is used herein to describe a user attempting to access a secure network through a user system that is physically connected to the network, illustratively the network of a corporation, but is an employee of a business partner with which the corporation has a pre-existing agreement to share network services. The user is mobile in that they are physically transplanted from their home site. It does not necessarily refer to the nature of their network connection within the partner corporation, which could be fixed or wireless. With reference to FIG. 1, supposing that the enterprise systems 22, 24 are partner sites that interact with each other in a partner extranet enabled by their respective gateways, a mobile user associated with the enterprise system 24 might locally connect to the enterprise system 22 while performing consulting duties. In this case, the user is a mobile user whose home site is the enterprise system 24, but is physically on-site and locally connected to the enterprise system 22.

The partners in this example have established a partner extranet connection, in which a gateway 36 is deployed in each enterprise system 22, 24 and configured to connect with each other. This partner extranet is used to allow the employees at each corporation to access services offered by the other, subject to policies enforced at each gateway. Embodiments of the present invention further extend this service access model to mobile users of partner corporations by providing enterprise network-based support, illustratively at the gateways, for seamless but secure user mobility.

As described in detail below, an authentication scheme for locally connected mobile users might involve a mobile user issuing an authentication request to an access device or apparatus, illustratively at the local gateway of the visited site, with their employer identified as the "domain" of their identity for instance. The local gateway could then automatically forward the request to the appropriate partner gateway, if available, and monitor for a response. If the remote partner gateway indicates a positive authentication, then the mobile user can be granted or denied access to one or more local services, possibly based on access policies associated with any or all of the particular mobile user, the associated partner corporation, the time of day, or multiple other criteria.

Mobile users can thus be granted access to the services that they need without requiring any manual action from the local network and application administrators. It should be appreciated, however, that operations or tasks other than access control could also or instead be dependent upon results of requested remote authentication.

FIG. 2 is a block diagram of an apparatus according to an embodiment of the invention. The apparatus 50 includes a user system interface 52, a partner network interface 54, a mobile user authentication module 56 operatively coupled to the user system interface and to the partner network interface, a partner domain database 58 operatively coupled to the mobile user authentication module, and a mobile user access module 60 operatively coupled to the mobile user authentication module, to a mobile user database 62, to an access policy database 64, and to one or more application server interfaces 66.

As noted above with reference to FIG. 1, the contents of the drawings are intended solely for the purposes of illustration. A device in which the apparatus 50 is implemented may include additional components that have not been explicitly shown, for example. These components might take various forms depending on the point at which, or the device/system in which, the apparatus 50 is implemented. In general, other embodiments of an apparatus may include further, fewer, or different components than explicitly shown, with similar or different interconnections.

The types of connections through which the components of FIG. 2 are operatively coupled may, to at least some extent, be implementation-dependent. Electronic devices often use various types of physical connectors and wired connections. In the case of cooperating software functions, for example, an operative coupling may be through variables, registers, or commonly accessed areas of a memory, and thus include a logical coupling.

Hardware, software, firmware, or combinations thereof may be used to implement components of the apparatus 50. Processing elements such as microprocessors, microcontrollers, Programmable Logic Devices (PLDs), Field Programmable Gate Arrays (FPGAs), Application Specific Integrated Circuits (ASICs), and other types of "intelligent" integrated circuits may be suitable for this purpose.

The apparatus 50 may interact with other components of a local communication network and an external network such as a partner network through the interfaces 52, 54, 66. These interfaces may be of the same type or different types, or even be the same interface where the same communication medium is used for information transfers with all other components. However, in many implementations, it is likely that the user system interface 52 will differ from at least the application server interface(s) 66, and that multiple application server interfaces of different types may be provided for different application servers. The partner network interface 54 may be another different interface.

The user system interface 52 enables the apparatus 50 to exchange application access information such as authentication requests and service messages with user systems. Each application server interface 66 similarly allows the apparatus 50 to exchange application access information with a respective set of one or more application servers. This type of architecture for the apparatus 50 might be appropriate, for example, when the apparatus is implemented at an application platform through which all application usage is handled or at a gateway through which usage of applications from partner user systems is handled, since these components process all application access information for an enterprise system. However, it should be appreciated that other implementations are also possible. A mobile user access apparatus might be involved in authenticating a mobile user and granting access to local services, but need not necessarily be actively involved in transferring service traffic between application servers and user systems, for example.

Through the partner network interface 54, the apparatus 50 may exchange information with a remote partner enterprise system. In the system of FIG. 1 for instance, inter-partner exchanges between enterprise system gateways may involve transfer of information through the communication network 12 and appropriate network interfaces at each gateway. According to embodiments of the invention, gateways in partner enterprise systems exchange information at least during mobile user authentication.

The structure and operation of the interfaces 52, 54, 66 will be dependent to at least some extent on the communication media and protocols used in information transfers. Those skilled in the art will be familiar with many types of interfaces through which application access information may be received and/or transmitted by the apparatus 50. These interfaces may also vary depending on where in an enterprise system the apparatus 50 is implemented.

Each of the databases 58, 62, 64 may be provided in one or more memory devices. Solid state memory devices are common in electronic equipment, and each database may be implemented using one or more memory devices of this type. However, other types of memory devices, including memory devices for use with movable or even removable storage media, may also or instead be used to store the databases 58, 62, 64.

The partner domain database 58 stores information associated with partner organizations. Partner information may include, for example, partner names, gateway addresses, and/or an indication of whether a mobility agreement exists for each partner. The mobile user database 62 stores mobile user identity information, such as temporary user identities that are automatically established during an authentication process to allow authenticated mobile users to access local services. Policies such as service access restrictions, information translation/formatting requirements, and/or monitoring information to be stored as a record of a mobile user's activity on a local network are stored in the access policy database 64. Any or all of user-specific policies, application/service-specific policies, partner-specific policies, and local enterprise-wide policies may be established by local administrators to control what mobile users can do in the local network.

As noted above, components of the apparatus 50 may be implemented using hardware, software, and/or firmware. These components are therefore described herein primarily in terms of their function. Based on the functional descriptions, a person skilled in the art will be enabled to implement service monitoring techniques according to embodiments of the invention in any of various ways.

In operation, the mobile user authentication module 56 and the mobile user access module 60 facilitate seamless user mobility, as described in further detail below, without manual provisioning of temporary identities or service access policies. An entire mobile user authentication and service access process may be automated, such that it is seamless to network and application administrators and yet does not sacrifice security or control of managed resources.

Automatic authentication of a mobile user through an external network with which the mobile user is associated provides a secure method to validate mobile users with the identity servers in their own network or home site. Mobile users may be granted temporary access to services based on existing service interoperability agreements and policies between partners, for example. Where service access is authorized through a gateway or other device that lies in the service path between an application server and a mobile user, complete control and monitoring can also be provided. The validation of a mobile user in a local network can also be automatically deactivated according to policies set by local network administrators, possibly with full traceability of mobile user access remaining in audit logs at a gateway, for example.

Functions involved in the implementation of seamless user mobility may include mobile user authentication, and in some embodiments access control. In the apparatus 50, these functions may be supported by the mobile user authentication module 56 and the mobile user access module 60. Other embodiments of the invention may provide a different division of these and possibly other functions between further, fewer, or different components.

Embodiments of the invention will now be described with reference to both FIGS. 1 and 2. Suppose that the gateway 36 and a corresponding gateway at the enterprise system 24 are used to establish a partner extranet with service interoperability agreements and policies that are enforced at the gateways. A user that is normally based in the enterprise system 24 but is on-site at the enterprise system 22 is a mobile user. Whereas "home" users of the enterprise system 22 are provisioned in the local identity system 40, a mobile user from the enterprise system 24, even though locally connected to the enterprise system 22, is not. The mobile user, however, would be known to the identity system of the enterprise system 24. The mobile user authentication module 56 allows the mobile user to be authenticated, and possibly granted access to services, in the enterprise system 22 based on the existing partner extranet, without requiring any additional action on the part of administrators at either of the enterprise systems 22, 24.

Through the user system interface 52, the apparatus 50, and in particular the mobile user authentication module 56, receives from the mobile user a request for authentication. Such a request might be in the form of an explicit request for authentication, including an indication of the partner with which the requesting mobile user is associated. In another possible embodiment, an authentication request is implicit in service access information such as an access request or other attempt by a mobile user to access a local application server 32. An access controller at the application platform 34, for example, might detect that such an access request is associated with a mobile user, and refer the access request, or possibly an automatically generated mobile user authentication request, to the mobile user authentication module 56. Processing of the request for access might then either be aborted, or at least halted, pending authentication of the mobile user.

This example of an implicit authentication request also illustrates the possibility that the mobile user authentication module 56 could potentially receive an authentication request indirectly, from another enterprise system component or device that "redirects" a mobile user authentication request, access request, or other access transaction. The user system interface 52 thus enables the apparatus 50 to receive some sort of information that initiates authentication of a mobile user, but this information need not necessarily be received directly from a user system. Although it might be most practical to restrict mobile users to locally connecting to a predetermined access point in an enterprise network, illustratively to the gateway 36, so as to avoid redirection processing of mobile user transactions, a redirection function at an enterprise system, such as in the application platform 34, might be desirable so as to provide flexibility as to where mobile users may locally connect to an enterprise system.

The mobile user authentication module 56 accesses the partner domain database 58 to determine whether there is an existing partner extranet relationship with the mobile user's home site. This determination may be made by searching the partner domain database 58 based on a mobile user identifier and/or partner identifier supplied in an authentication request for instance. If no partner mobility relationship exists, then the mobile user is denied access to the local network. A record of the request might be stored in an audit trail or activity tracking database (not shown) for later review and/or analysis by administrators.

Where there is an existing user mobility relationship with the mobile user's home site, the mobile user authentication module 56 may send an authentication request to the home site on behalf of the mobile user through the partner network interface 54. The mobile user authentication module 56, or another component of a gateway for example, might first confirm that a connection with the remote partner site, or that site's gateway in some embodiments, is available. Any of various error processing functions may be performed in the event that the connection is not available.

At the mobile user's home site, an apparatus having a substantially similar structure to the apparatus 50 could be provided to process remote authentications. Through its own partner network interface 54, the partner site mobile user authentication module 56, which might actually be or operate in conjunction with the partner site identity system, receives a remote authentication request relating to the mobile user. Using its own user database and user mobility policies, for example, the partner site authentication module attempts to authenticate the mobile user.

Authentication might fail if authentication information provided by the mobile user does not match authentication information stored locally at the home site. An authentication failure might also be due, for example, to a timeout, a connection fault, or a user not being authorized for mobility by the home site administrator. A security attack or breach may be another cause for an authentication failure. An attempt by an attacker to locally access a service as a mobile user might be detected by the mobile user's home site if that mobile user is logged in at the home site when the remote authentication request is received, for instance.

In the event of an authentication failure, a home site authentication module or identity system might return a negative authentication reply to the requesting site, or not reply at all if the mobile user authentication module 56 that initiated remote authentication is adapted to declare an authentication failure in the absence of a reply from the home site within a predetermined period of time.

If authentication of the mobile user is successful, the home site mobile user authentication module may create, and locally store, a mobile user identity. This mobile user identity and a positive authentication reply are returned to the requesting site at which the mobile user is connected. At the requesting site, the mobile user authentication module 56 checks to confirm that the mobile user was successfully authenticated by their home site, and the mobile user identity is stored in the mobile user database 62 and also forwarded to the mobile user through the user system interface 52.

In the apparatus shown in FIG. 2, the mobile user authentication module 56 receives the authentication reply and mobile user identity from the partner site through the interface 54, and passes the identity to the mobile user access module 60 for storage in the mobile user database 62. Where the mobile user authentication module 56 is also operatively coupled to the mobile user database 62, then it could store the identity to the database directly. As indicated by the broken line in FIG. 2, the mobile user access module 60 might also be operatively coupled to the partner network interface 54, in which case it could receive the identity from the interface. Thus, as noted above, interconnections between components might vary from those shown in FIG. 2.

It should be appreciated that a positive authentication reply and a mobile identity need not necessarily be separate and distinct. A reply from a partner site that includes a mobile user identity could infer that the mobile user has been authenticated, for example.

Embodiments of the invention also may or may not use dynamically generated mobile user identities. Such identities, however, may be useful where home site usernames and passwords are not to be shared with partner domains. Although a mobile user could provide a home site username and password to the mobile user authentication module 56 for transfer back to the home site, this scheme would effectively compromise the mobile user's username and password. While trusted partner sites that allow user mobility might not represent a significant security risk, at least network administrators generally prefer not to distribute usernames, passwords, and other authentication information outside their networks.

The generation of mobile user identities for use by mobile users to gain access to resources when locally connected to a remote partner site avoids the dissemination of home site authentication information. In an initial authentication request or access transaction responsive to which home site authentication is initiated, a mobile user might provide a personal name or other non-confidential information on the basis of which the local mobile user authentication module 56, or at least the home site identity system, can identify the mobile user. In the event that additional information is required for authentication of the mobile user by the home site, the mobile user authentication module 56 could establish a secure tunnel or other secure connection between the mobile user system and the home site. In this case, home site authentication information can be transferred between the mobile user system and the home site without being compromised by the mobile user authentication module 56 or other components of a visited site.

A mobile user identity that is stored at the home site, as noted above, can be mapped to the mobile user for historical monitoring or tracking purposes, for example, but does not compromise the confidentiality of home site authentication information. Mobile user activity reports may be provided to the home site from a visited site, by the mobile user access module 60 as described below for instance, for a mobile user identity, and then associated with the correct mobile user by a user activity monitoring system at the home site.

In the above authentication example, the mobile user was authenticated without requiring any manual actions on the part of network or application administrators at the visited site. The authentication was based on existing security models of the partner extranet.

After successful authentication, the mobile user may be able to consume local services at the visited site. Authorization of access to services for the mobile user is handled in the apparatus 50 by the mobile user access module 60.

The mobile user access module 60 may receive from an authenticated mobile user a service access request that includes the mobile user identity that was previously obtained by the mobile user during authentication. Such a request may be received through the user system interface 52, and need not be processed by the mobile user authentication module 56 since authentication has already been completed in this example.

Information in the mobile user database 62 is accessed by the mobile user access module 60, illustratively by searching for the mobile user identity, to validate the mobile user. The mobile user access module 60 may also determine any access policies that are to be applied to the access request by identifying such policies in the access policy database 64. These policies may include global visited site policies and/or any or all of mobile user-, mobile user home site-, and/or service-specific policies.

A network administrator might set a policy for a contracting company, for example, that allows mobile users from that company to access only required services or applications, for example. Mobile users from the contracting company, once authenticated, are then automatically given access to the required services or applications. Thus, access to services by a mobile user may be controlled by the mobile user access module 60 in accordance with policies established by administrators of the local site at which those services reside. Policies might be established through an application manager at the visited site, for example, based on partner user mobility agreements.

A received request, if compliant with applicable access policies, is forwarded to the application server that supports the service through an application server interface 66. Service access information, such as requests and responses involved in a service transaction, destined to a mobile user from an application server may be handled in a substantially similar manner.

Using the above techniques, authenticated mobile users can be granted access to the services that they need without requiring any manual action from network and application administrators. A partner extranet service access model can thereby be seamlessly extended to mobile users of a partner corporation.

Access policies stored in the access policy database 64 may specify other access-related restrictions or requirements. An access policy might specify how long a mobile user may access local services or how many different local services or applications may be accessed before that mobile user must be re-authenticated with the home site.

Monitoring criteria could also or instead be specified in access policies. A policy might instruct the mobile user access module 60 to record all access activity by a mobile user as service messages are transferred between the mobile user and application servers, for example. Actual service messages or transformations such as hashes or digital signatures of services messages could be stored in a session database (not shown), for instance. Activity record reporting might also be specified in access policies. The mobile user access module 60 might report activity records back to a home site in real time, at periodic intervals, or when a session is terminated, either voluntarily by a user or forcibly by an administrator or the mobile user access module 60, such as when a mobile user is required to re-authenticate or exceeds access time or activity restrictions. Activity record reporting could be useful for tracking mobile user activity, demonstrating regulatory compliance, conducting audits, etc.

Activity monitoring and reporting might be provided in the manner disclosed in the related United States Provisional Patent Application entitled "COMMUNICATION NETWORK APPLICATION ACTIVITY MONITORING AND CONTROL", referenced above.

An enterprise system may enable external user systems, located at partner sites, to access its services. In this case, the application platform 34 and/or the gateway 36 (FIG. 1) might perform any necessary data transformations for the external user systems. Since a mobile user is effectively a relocated external user, the transformations that would have been performed during transfer of data to the mobile user's home site might still be needed. Therefore, it may be useful in some embodiments to restrict mobile user access to access points in an enterprise system that are at an output side of an external transformation function, or to redirect mobile user service-related information through such a function. The mobile user access module 60 could be configured to pass all service traffic to a transformation module or engine, for example, to ensure that service messages and other service-related information will be in the proper form for a mobile user system.

To this end, mobile user systems might be connectable within the enterprise system 22 only through the gateway 36 (FIG. 1), for example, so that service-related traffic can be processed through the correct transformation(s) required for a mobile user, which would normally be applied by the gateway. Even though a mobile user might be connecting to a visited site through an internal interface of that site, the mobile user could still be treated as though access were being provided through an external connection.

A determination as to whether external transformations are to be applied to service access information may be based, for example, on a user identity included in the service access information. Such a determination may also or instead be dependent on a physical interface through which the service access information is received. Mobile users might be restricted to accessing local services through certain interfaces of a gateway or application platform, for instance, in which case transformations are applied to service access information that is transferred through those interfaces.

Figure 3:
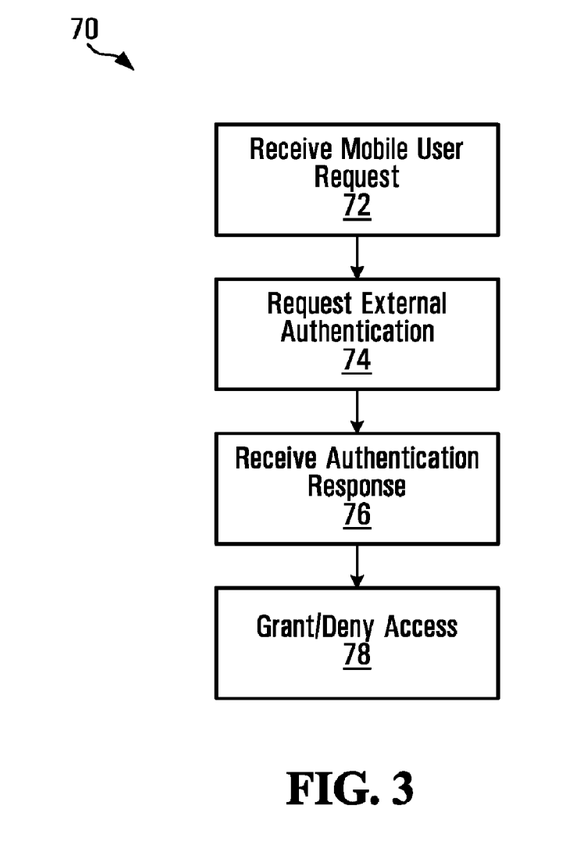
FIG. 3 is a flow diagram of a method according to another embodiment of the invention.

Embodiments of the invention have been described above primarily with reference to the communication system 10 of FIG. 1 and the apparatus 50 of FIG. 2. FIG. 3 is a flow diagram of a method according to another embodiment of the invention.

The method 70 illustrates operations involved in authenticating a mobile user and controlling access to local services by that mobile user.

At 72, a request or other application access information associated with a mobile user, illustratively an authentication request message, is received. An authentication request message might be received from a mobile user system or from a component that is adapted to redirect mobile user authentication request messages, for example, as described above.

External authentication of the mobile user is requested from the home site of the mobile user at 74. An authentication response, which may include a mobile user digital identity to be used by the mobile user in accessing local services, is received from the home site at 76. In some embodiments, this mobile user identity is a temporary identity.

If the external authentication succeeds, then the mobile user is subsequently granted access to local services at 78 in accordance with any applicable access policies. Otherwise, access to local services by the mobile user is denied. An indication of an authentication failure could be stored in audit records and/or returned to the mobile user. As described above, an authentication failure at the home site might not be explicitly communicated to a requesting site at 76 in all embodiments. The home site might simply not respond to an authentication request within a required response time when authentication does not succeed.

The method 70 is illustrative of one embodiment of the invention. Other embodiments may involve performing fewer, additional, or different operations, and/or performing operations in a different order than shown.

For example, authentication could involve transferring other information than an authentication request. A request for mobile user authentication could establish a secure tunnel between a mobile user system and the home site, for instance, with authentication information such as home site username and password then being provided to the home site by the mobile user system through the secure tunnel.

Once authentication of a mobile user has successfully completed at 74, 76, processing of service-related information such as service messages that originate with or are destined for a mobile user may involve validating a mobile user identity. Although the mobile user might be required to re-authenticate after a certain amount of time or after a certain number of service access operations or transactions have been performed, as specified in access policies, such that the method 70 is repeated, the mobile user need not necessarily be re-authenticated for every service transaction.

Operations such as any or all of verifying partner mobility relationships, checking partner connections, transforming service-related information, and collecting and reporting mobile user activity could also be performed in some embodiments.

Although not explicitly shown in FIG. 3, actual authentication of a mobile user takes place at that user's home network or site. Responsive to a received authentication request, for instance, the home network attempts to authenticate the mobile user and provides an indication of a result of the authentication to the requesting network.

Further variations of the method 70 may be or become apparent to those skilled in the art.

Figure 4:
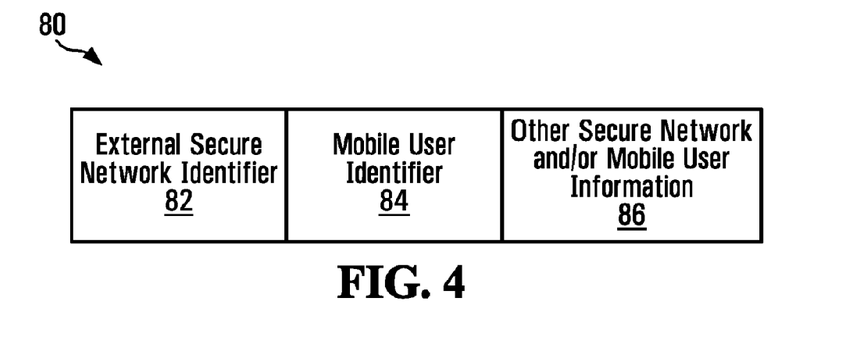
FIG. 4 is a block diagram of a data structure that may be used in embodiments of the invention.

FIG. 4 is a block diagram of a data structure that may be used in embodiments of the invention. Records having a format as shown in FIG. 4 might be stored in one or more of the databases 58, 62 (FIG. 2), for example, at a secure communication network. The data structure 80 includes an identifier 82 of an external secure network with which the network that stores the data structure has a user mobility arrangement. An identifier of a mobile user associated with the external network is provided at 84. Each identifier 82, 84 may include a name, an address, and/or some other form of identifying information.

Other information relating to the identified external network and/or the identified mobile user is stored in the data structure 80 at 86.

A data structure might include fewer, further, or different data fields than shown in FIG. 4, depending on its purpose. In the partner domain database 58 (FIG. 2), for example, a data structure might include an external network identifier 82 and other network information at 86 such as an indication of a user mobility arrangement and/or restrictions. A record in the mobile user database 62 might include all three of the fields shown in FIG. 4, so as to map a mobile user identity to its corresponding external network and other information such as a service usage record.

Embodiments of the invention provide a new technique for automatically authenticating on-site employees of partner corporations (i.e., mobile users) without any manual provisioning of identities. Partner corporations might first establish a partner extranet connection, illustratively by deploying respective gateways in their corporate networks and configuring these gateway devices to connect with each other. The partner extranet is used to allow the employees at each corporation to access services offered by the other, subject to policies enforced at each gateway.

The techniques disclosed herein may leverage the fact that gateways can potentially provide partner authentication and validation of a mobile user's identity based on the interpretation of credentials such as a digital certificate to establish a secure connection between corporations and identity interoperability. Embodiments of the invention may be integrated with existing identity infrastructure, such as LDAP servers, to allow validation of users with the identity infrastructures of their employers. The service access model supplied by a partner extranet can thereby be extended to mobile users of a partner corporation.

Cost savings could be realized by corporate network operators by implementing embodiments of the invention to remove the insecure and labor intensive task of manual creation and maintenance of temporary user identities for mobile users. Depending on the particular situation at a corporation, seamless mobility of users within their partner extranet has the ability to reduce information technology overhead, streamline outsourcing operations, and close existing security gaps.

Automation of the process of granting network and service access to temporary mobile users of partner corporations provides for user mobility that is seamless to network and application administrators and does not sacrifice security or control of their resources.

Advantages of embodiments of the invention may include any or all of:
  automatic authentication of mobile users with the identity servers in their own network;
  automatic temporary access to services based on the existing service interoperability agreements and policies between corporations;
  all service access can be authorized through a corporate network gateway, allowing for complete control and monitoring;
  temporary service access can be automatically removed, illustratively in accordance with an expiration time set in an access policy; and
  full traceability of application and service access in audit logs.

More generally, embodiments of the invention can be used to provide the complete functionality of a full service SOA infrastructure as follows:
  Corporate Governance: provides monitoring, control and reporting to ensure compliance with regulations and supports continued corporate improvement;
  Managed Partner Extranet: secured seamless publishing and consumption of web services with partners and branch locations;
  Web Service Performance: ensures availability and performance of web services as per corporate requirements or Service Level Agreements (SLAs);
  Corporate Agility & Application Sensitivity: provides application-level routing and message translation based on content of SOAP headers, XML tags, or other message content;
  Application Security: provides application-level security by ensuring messages are well formed, detecting XML-based attacks and enforcing application data encryption policy;
  Life Cycle Management: provides controlled publishing of web services with rollback;
  System Features: provides reliability, scalability, and compliance with open standards.

These and other functions have been disclosed herein, and/or in one or more of the above-referenced related patent applications.

What has been described is merely illustrative of the application of principles of embodiments of the invention. Other arrangements and methods can be implemented by those skilled in the art without departing from the scope of the present invention.

For example, as noted above, the present invention is in no way limited to the particular divisions of functions or method steps shown in the drawings and explicitly described above. It should also be appreciated that the techniques disclosed herein in are in no way limited to implementation in conjunction with a partner extranet. A controller/monitor in an apparatus that is substantially similar to the apparatus 50 of FIG. 2 need not necessarily be a partner extranet controller/monitor.

In addition, although described primarily in the context of methods and systems, other implementations of embodiments of the invention are also contemplated, as data structures and/or instructions stored on one or more machine-readable media, for example.

We claim:

1. A method comprising:
   receiving an authentication request, from a first secure intranet network in which a network service is provided, for an independently controlled second secure intranet network, with which a mobile user is associated, to authenticate the mobile user for local access to the network service from within the first secure intranet network, the authentication request being received at the second secure intranet network and comprising a request by the first secure intranet network for the second secure intranet network to authenticate the mobile user for local access to the network service from within the first secure intranet network;
   the second secure intranet network authenticating the mobile user according to user identity records at the second secure intranet network; and
   the second secure intranet network providing to the first secure intranet network an indication of a result of the authentication,
the method further comprising:
   creating at the second secure intranet network a digital user identity to be used by the mobile user in the first secure intranet network, where the mobile user is successfully authenticated,
   wherein the providing comprises providing the user identity to the first secure intranet network.

2. The method of claim 1, further comprising:
   controlling, at the first secure intranet network, access to the network service by the mobile user based on a result of the authentication by the second secure intranet network.

3. The method of claim 2, wherein controlling comprises granting access to the network service in accordance with an access policy.

4. The method of claim 1, further comprising:
   receiving, at the first secure intranet network, from the second secure intranet network the digital user identity to be used by the mobile user in the first secure intranet network.

5. The method of claim 4, further comprising:
   storing the identity in a mobile user database at the first secure intranet network; and
   forwarding the identity to the mobile user.

6. The method of claim 1, further comprising:
   receiving, at the first secure intranet network, service access information associated with local access to the network service by the mobile user, wherein the service access information comprises a user authentication request; and
   the first secure intranet network requesting the second secure intranet network to authenticate the mobile user.

7. The method of claim 1, further comprising:
   receiving, at the first secure intranet network, service access information associated with local access to the network service by the mobile user, wherein the service access information comprises a service access request;
   determining, at the first secure intranet network, whether the mobile user has been previously authenticated by the second secure intranet network; and
   the first secure intranet network requesting the second secure intranet network to authenticate the mobile user where the mobile user has not been previously authenticated by the second secure intranet network.

8. The method of claim 1, further comprising:
   receiving, at a web services node of the first secure intranet network, service access information associated with local access to the network service by the mobile user.

9. The method of claim 1, wherein a transformation is applied to service access information, associated with external access to the network service by the mobile user from the second secure intranet network, for transfer between the mobile user and an application server by which the network service is provided, the method further comprising:
   receiving, at the first secure intranet network, service access information associated with local access to the network service by the mobile user; and
   applying the transformation to the received service access information.

10. The method of claim 1, further comprising:
    tracking activity of the mobile user in the first secure intranet network; and
    reporting the tracked activity from the first secure intranet network to the second secure intranet network.

11. A non-transitory machine-readable medium storing instructions which when executed perform the method of claim 1.

12. The method of claim 1, wherein the first secure intranet network and the second secure intranet network are partner sites that interact with each other in a partner extranet.

13. The method of claim 12, wherein a first gateway in the first secure intranet network and a second gateway in the second secure intranet network enable the partner extranet.

14. An apparatus comprising:
    an interface for exchanging information between a first secure intranet network and an independently controlled second secure intranet network; and
    an authentication module operatively coupled to the interface and operable:
    to receive through the interface, at the second secure intranet network, an authentication request from the first secure intranet network for the second secure intranet network to authenticate a mobile user associated with the second secure intranet network for local access from within the first secure intranet network to a network service provided in the first secure intranet network, the authentication request comprising a request by the first secure intranet network for the second secure intranet network to authenticate the mobile user for local access to the network service from within the first secure intranet network;
    to authenticate the mobile user, at the second secure intranet network, according to user identity records at the second secure intranet network; and
    to provide an indication of a result of the authentication from the second secure intranet network to the first secure intranet network through the interface,
    at least one of the interface and the authentication module being implemented using hardware,
    wherein the authentication module is further configured to create, at the second secure intranet network, a digital user identity to be used by the mobile user in the first secure intranet network, where the mobile user is successfully authenticated, and to provide an indication of a result of the authentication by providing the user identity to the first secure intranet network.

15. The apparatus of claim 14, further comprising:
an access module, at the first secure intranet network, operable to control access to the network service by the mobile user based on a result of the authentication by the second secure intranet network.

16. The apparatus of claim 15, wherein the access module is further operable to track activity of the mobile user in the first secure intranet network, the apparatus further comprising:
an interface operatively coupled to the access module for enabling the tracked activity to be reported from the first secure intranet to the second secure intranet network.

17. The apparatus of claim 15, further comprising:
a memory operatively coupled to the access module for storing service access policies,
wherein the access module is further operable to determine whether the memory stores a policy in accordance with which access to the network service by the mobile user is to be controlled, and, where the memory stores a policy in accordance with which access to the network service by the mobile user is to be controlled, to control access to the network service by the mobile user by granting or denying access to the network service based on the policy stored in the memory.

18. The apparatus of claim 14, further comprising:
an authentication module, at the first secure intranet network, that is operable to receive from the second secure intranet network the digital user identity to be used by the mobile user in the first secure intranet network.

19. The apparatus of claim 18, further comprising:
a memory for storing the identity in a mobile user database at the first secure intranet network; and
an interface enabling the identity to be forwarded to the mobile user.

20. The apparatus of claim 14, further comprising, at the first secure intranet network:
an interface operable to receive service access information associated with local access to the network service by the mobile user; and
an authentication module operatively coupled to the interface at the first secure intranet network,
wherein the service access information comprises a service access request, and wherein the authentication module at the first secure intranet network is operable to determine, at the first secure intranet network, whether the mobile user has been previously authenticated by the second secure intranet network, and to send, from the first secure intranet network to the second secure intranet network, the authentication request for the second secure intranet network to authenticate the mobile user where the mobile user has not been previously authenticated by the second secure intranet network.

21. The apparatus of claim 14, further comprising, at the first secure intranet network:
a gateway that enables remote usage of the network service from the second secure intranet network, the gateway being configured to perform a transformation of information relating to remote usage of the network service from the second secure intranet network, and to perform the transformation for information relating to local access to the network service by the mobile user.

* * * * *